(12) United States Patent
Igarashi et al.

(10) Patent No.: US 11,215,964 B2
(45) Date of Patent: Jan. 4, 2022

(54) NUMERICAL CONTROLLER

(71) Applicant: FANUC CORPORATION, Yamanashi (JP)

(72) Inventors: Hyuma Igarashi, Yamanashi (JP); Takeshi Mochida, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 55 days.

(21) Appl. No.: 16/262,128

(22) Filed: Jan. 30, 2019

(65) Prior Publication Data
US 2019/0258215 A1 Aug. 22, 2019

(30) Foreign Application Priority Data

Feb. 20, 2018 (JP) .............................. JP2018-028212

(51) Int. Cl.
*G05B 19/19* (2006.01)
*G05B 19/4155* (2006.01)

(52) U.S. Cl.
CPC .... *G05B 19/19* (2013.01); *G05B 2219/36199* (2013.01); *G05B 2219/37082* (2013.01)

(58) Field of Classification Search
CPC .......... G05B 19/19; G05B 2219/36199; G05B 2219/37082; G05B 2219/50105; G05B 2219/50102; G05B 2219/31399; G05B 19/4155

See application file for complete search history.

(56) References Cited

U.S. PATENT DOCUMENTS

| 2014/0012408 A1* | 1/2014 | Haga | G05B 19/0426 700/159 |
| 2015/0314394 A1* | 11/2015 | Mori | G05B 19/4067 219/121.83 |
| 2016/0209825 A1* | 7/2016 | Murakawa | G05B 19/4068 |

(Continued)

FOREIGN PATENT DOCUMENTS

| JP | 6-59717 | 3/1994 |
| JP | 2010-44489 | 2/2010 |

(Continued)

OTHER PUBLICATIONS

Notification of Reasons for Refusal dated Jan. 28, 2020 in Japanese Patent Application No. 2018-028212.

*Primary Examiner* — Thomas C Lee
*Assistant Examiner* — Anzuman Sharmin
(74) *Attorney, Agent, or Firm* — Wenderoth, Lind & Ponack, L.L.P.

(57) ABSTRACT

A numerical controller comprises a restart position candidate setting unit configured to store information on a block serving as a restart position candidate where machining is to be restarted, on the basis of a result of an analysis of a machining program, a block head position drawing unit configured to draw, when the machining is interrupted, a machining position corresponding to a head of the block serving as a restart position candidate stored by the restart position candidate setting unit, on the machining path displayed on a machining path graphic screen, and a restart block setting unit configured to set a block corresponding to a machining position designated by a user from among the machining positions drawn by the block head position drawing unit, as a restart block.

6 Claims, 5 Drawing Sheets

(56) References Cited

U.S. PATENT DOCUMENTS

2016/0321045 A1\* 11/2016 Radigan ................ G06F 8/443
2016/0327929 A1\* 11/2016 Chebroux .......... G05B 19/0415
2018/0032055 A1\* 2/2018 Janssen ................ G06F 8/436

FOREIGN PATENT DOCUMENTS

| JP | 2015-208775 | 11/2015 |
| JP | 2016-134036 | 7/2016 |

\* cited by examiner

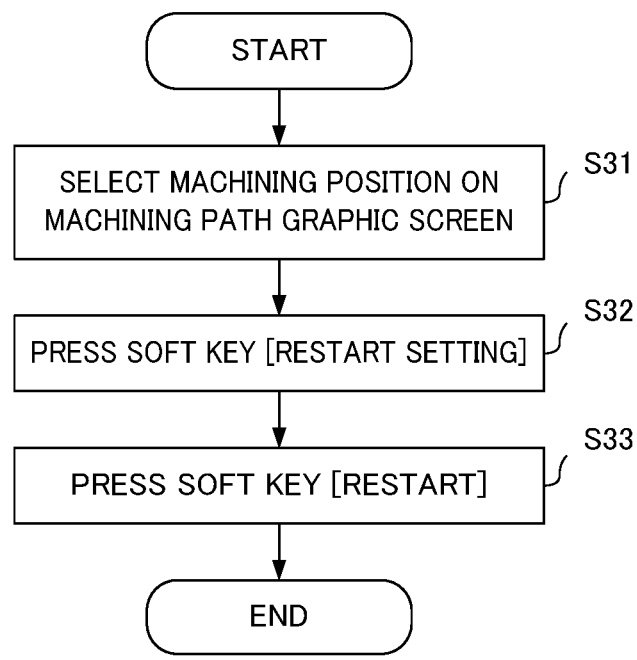

NUMERICAL CONTROLLER

This application is based on and claims the benefit of priority from Japanese Patent Application No. 2018-028212, filed on 20 Feb. 2018, the content of which is incorporated herein by reference.

BACKGROUND OF THE INVENTION

Field of the Invention

The present invention relates to a numerical controller.

Related Art

A known conventional controller controls a machine tool, for example, a lathe, a drilling machine, a boring machine, a milling machine, a grinding machine, a gear cutting and gear finishing machine, a machining center, an electrical discharge machine, a punch press machine, a laser machine, a conveying machine, or a plastic injection molding machine.

In an example case of a laser cutting system for machining a workpiece by using a laser beam, a controller may interrupt, during execution of a laser cutting program, the execution of the laser cutting program due to abnormality in power supply or supply of a medium (gas, in particular) for laser oscillation, abnormality in supply of assist gas to a machining point or the like, or in response to an intentional stop instruction by an operator, an emergency stop signal for securing safety, or the like.

Some of known laser cutting systems are each capable of restarting, after the interruption of execution of a laser cutting program, the execution of the laser cutting program being at a position different from the position at the time of interruption.

In this regard, Paten Document 1 discloses the technique in which, when a machining operation is interrupted during machining a workpiece, information on this interruption point (for example, a sequence number indicating the interruption position in the program, a program counter, the name and number of the program, the name and number of the master program thereof, information for specifying the position in the master program having invoked the program and for specifying the function having been executed in the interrupted block, position data, and information on macro variable) as machining restart block data and the current status of the numerical control are stored in a memory, and the machining restart block data is used at the time of restarting the program to perform temporary execution of the program up to the block to be restarted ("temporary execution": execution of calculation processing of a program without driving of a machine), and thereby modal information (or function information) and/or the status of an auxiliary function are restored for restarting.

Paten Document 1 discloses another technique for restarting, in which the program is searched for a sequence number without the temporary execution up to the position to be restarted in the program, or the blocks in the program are counted without the temporary execution and then searching is performed up to a machining restart block, thereby performing high-speed movement to an intended position in the program.

Patent Document 2 discloses a numerical controller comprising an operating status determination unit and a restart condition specification unit, so that a laser cutting system accurately determines an operating status of a laser machine at the time when the execution of a laser cutting program is interrupted, to appropriately set the restart conditions of the laser machine for restarting the execution of the laser cutting program in accordance with the operating status at the time of the interruption. The operating status determination unit determines whether or not the operating status of the laser machine at the time when the execution of the laser cutting program is interrupted corresponds to the state under laser cutting in which a workpiece is actually being machined. The restart condition specification unit specifies, in response to the result of the determination by the operating status determination unit, the restart conditions of the laser machine (for example, operation conditions in the laser oscillator, the position of a machining head) for restarting the execution of the laser cutting program, in predetermined conditions in the laser cutting program.

With this configuration, for example, the controller disclosed in Patent Document 2 is capable of automatically restarting the laser machine, by specifying, as a restart condition C, any one of the restart positions of (1) a position Q4 just before a position Q5 at which the execution of a laser cutting program P has been interrupted, (2) a position Q3 of the start point of the block including the position Q5 at which the execution of the laser cutting program P has been interrupted, (3) a position Q2 of the start point of a block before the block including the position Q5 at which the execution of the laser cutting program P has been interrupted, or (4) a position Q6 of the machining start point on the machining path following the machining path including the position Q5 at which the execution of the laser cutting program P has been interrupted, and by performing control for moving a machining head 34 at any position specified out of (1) to (4), and on the basis of other restart conditions required for restarting machining such as operation conditions in the laser oscillator.

As described above, in a conventional numerical controller, for example, a user searches the machining program for a sequence number, or counts the blocks in the program without the temporary execution and searches the machining program up to a machining restart block, thereby enabling to perform high-speed movement to an intended position in the program for restarting.

In addition, the conventional numerical controller is capable of, after setting the restart position on the basis of the position at which the execution of the laser cutting program P has been interrupted, performing control to move a machining head, and automatically restarting a laser machine on the basis of other restart conditions required for machining restart such as operation conditions in the laser oscillator.

Patent Document 1: Japanese Unexamined Patent Application, Publication No. 2010-044489

Patent Document 2: Japanese Unexamined Patent Application, Publication No. 2015-208775

SUMMARY OF THE INVENTION

In the case of restarting the machining program after the interruption of the execution of the conventional machining program, for example, an operator needs to search the machining program on the basis of the block number or the like in the machining program at the time of interruption, in order to set the restart block.

However, since the operator sets the restart block by searching the machining program itself, the operator needs to perform many steps in the procedure related to the restart of the machining program, and has difficulty in intuitively grasping the position of the block serving as the restart position at which the machining is to be restarted on then actual machining path.

The purpose of the present invention is to provide a numerical controller which displays program restart position candidates on the machining path displayed on a display unit in the case of restarting machining after the interruption of the execution of a machining program, and thereby allows an operator to visually grasp the restart position candidates at which the machining is to be restarted on the actual machining path, and to set the restart position from among the restart position candidates displayed on the machining path, resulting in fewer steps in the procedure prior to restarting the machining.

(1) A numerical controller (for example, "a numerical controller 100" to be described below) according to the present invention comprises a display unit (for example, "a display unit 170" to be described below) configured to display a machining path graphic screen, a machining program analysis unit (for example, "a machining program analysis unit 121" to be described below) configured to analyze a machining program prior to machining, an unmachined path drawing unit (for example, "an unmachined path drawing unit 122" to be described below) configured to draw an unmachined machining path on the machining path graphic screen, on a basis of a result of an analysis of the machining program, a restart position candidate setting unit (for example, "a restart position candidate setting unit 123" to be described below) configured to store information on a block serving as a restart position candidate where the machining is to be restarted, on the basis of the result of the analysis of the machining program, a during-machining drawing unit (for example, "a during-machining drawing unit 124" to be described below) configured to display current positions under machining moment by moment during the machining, a block head position drawing unit (for example, "a block head position drawing unit 125" to be described below) configured to draw, when the machining is interrupted, a machining position corresponding to a head of the block serving as a restart position candidate stored by the restart position candidate setting unit, on the machining path displayed on the machining path graphic screen, and a restart block setting unit (for example, "a restart block setting unit 126" to be described below) configured to set a block corresponding to a machining position designated by a user from among the machining positions drawn by the block head position drawing unit, as a restart block.

(2) In the numerical controller according to (1), the restart position candidate setting unit (for example, "the restart position candidate setting unit 123" to be described below) may store, as the restart position candidate, at least one type of block out of an interruption block, a block including a subprogram call command, a block including a macro call command, a block including a macro modal call command, a block including a G code command enabling a predetermined function, a block including an M code command, a block including a B code command, and a positioning block.

(3) In the numerical controller according to (1) or (2), the during-machining drawing unit (for example, "the during-machining drawing unit 124" to be described below) may superimpose and draw the current positions under machining along the machining path moment by moment on the unmachined machining path drawn by the unmachined path drawing unit.

(4) In the numerical controller according to (1) to (3), when the machining program is a laser cutting program, the restart position candidate setting unit (for example, "the restart position candidate setting unit 123" to be described below) may store, as the restart position candidate, at least one type of block out of an interruption block, a block including a subprogram call command, a block including a macro call command, a block including a macro modal call command, a block including a G code command enabling a predetermined function, a block including an M code command, a block including a B code command, a positioning block, a block including a piercing command, a block including a gap control command, and a block including an assist gas command.

(5) The numerical controller according to (1) to (4) may further comprise a restart control unit (for example, "a restart control unit 127" to be described below) configured to automatically execute a preparation program for setting at least one of a modal and an auxiliary function required for restarting the machining, in response to restart instruction from a user based on the restart block set by the restart block setting unit (for example, "the restart block setting unit 126" to be described below).

(6) In the numerical controller according to (5), when the restart block set by the restart block setting unit is a block including a piercing command, a block including a gap control command, or a block including an assist gas command, the restart control unit (for example, "the restart control unit 127" to be described below) may automatically execute a preparation program related to the piercing command, the gap control command, or the assist gas command, in response to the restart instruction from the user.

The present invention enables to provide a numerical controller, which displays program restart position candidates on the machining path displayed on a display unit in the case of restarting machining after the interruption of the execution of a machining program, and thereby allows an operator to visually grasp the restart position candidates at which the machining is to be restarted on the actual machining path, and to set the restart position from among the restart position candidates displayed on the machining path, resulting in fewer steps in the procedure prior to restarting the machining.

BRIEF DESCRIPTION OF THE DRAWINGS

FIG. 5 is a flowchart indicating an example of the operation procedure of the numerical controller according to the embodiment of the present invention.

DETAILED DESCRIPTION OF THE INVENTION

1. First Embodiment

The description below with reference to FIG. 1 to FIG. 4 is about a numerical controller according to the first embodiment of the present invention.

Figure 1:
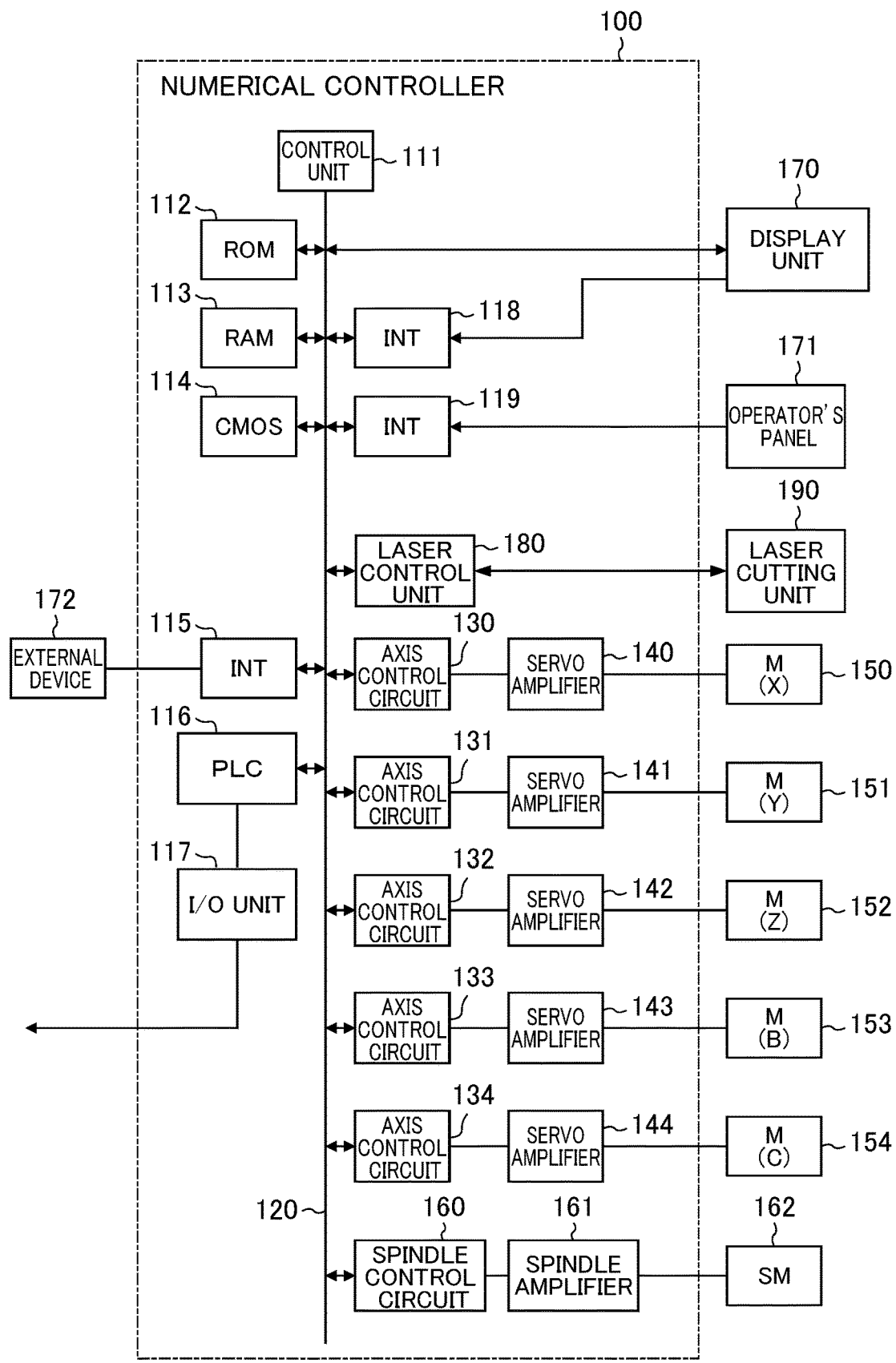
FIG. 1 is a diagram illustrating a configuration of a numerical controller according to an embodiment of the present invention.

FIG. 1 is a configuration diagram of a numerical controller 100.

Figure 2:
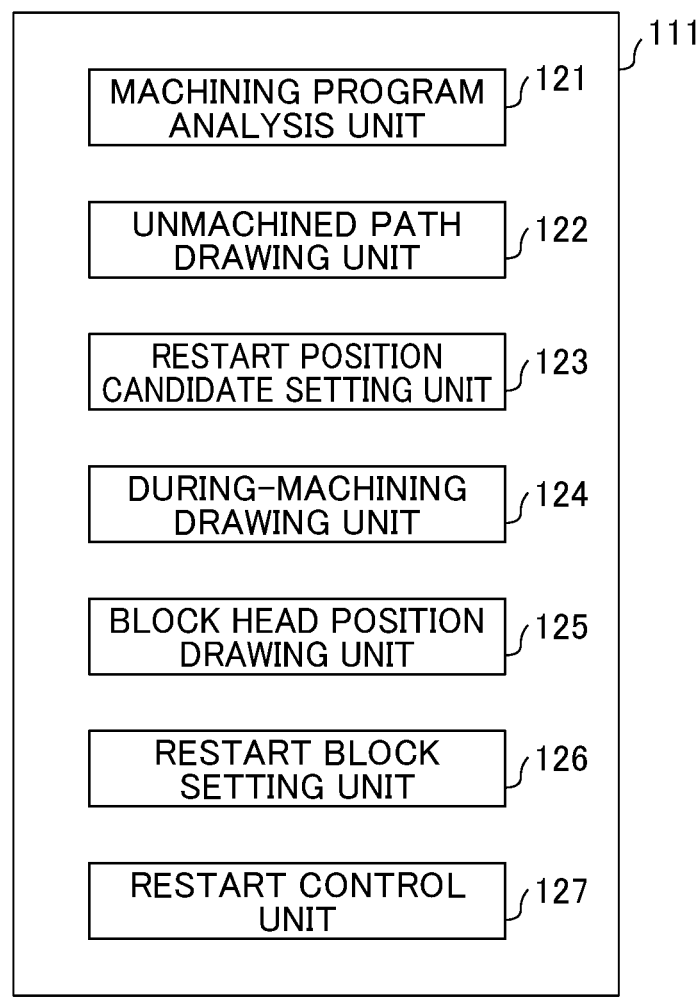
FIG. 2 is a functional block diagram of a control unit comprised in the numerical controller according to the embodiment of the present invention.

FIG. 2 is a functional block diagram of a control unit 111 comprised in the numerical controller 100.

Figure 3:
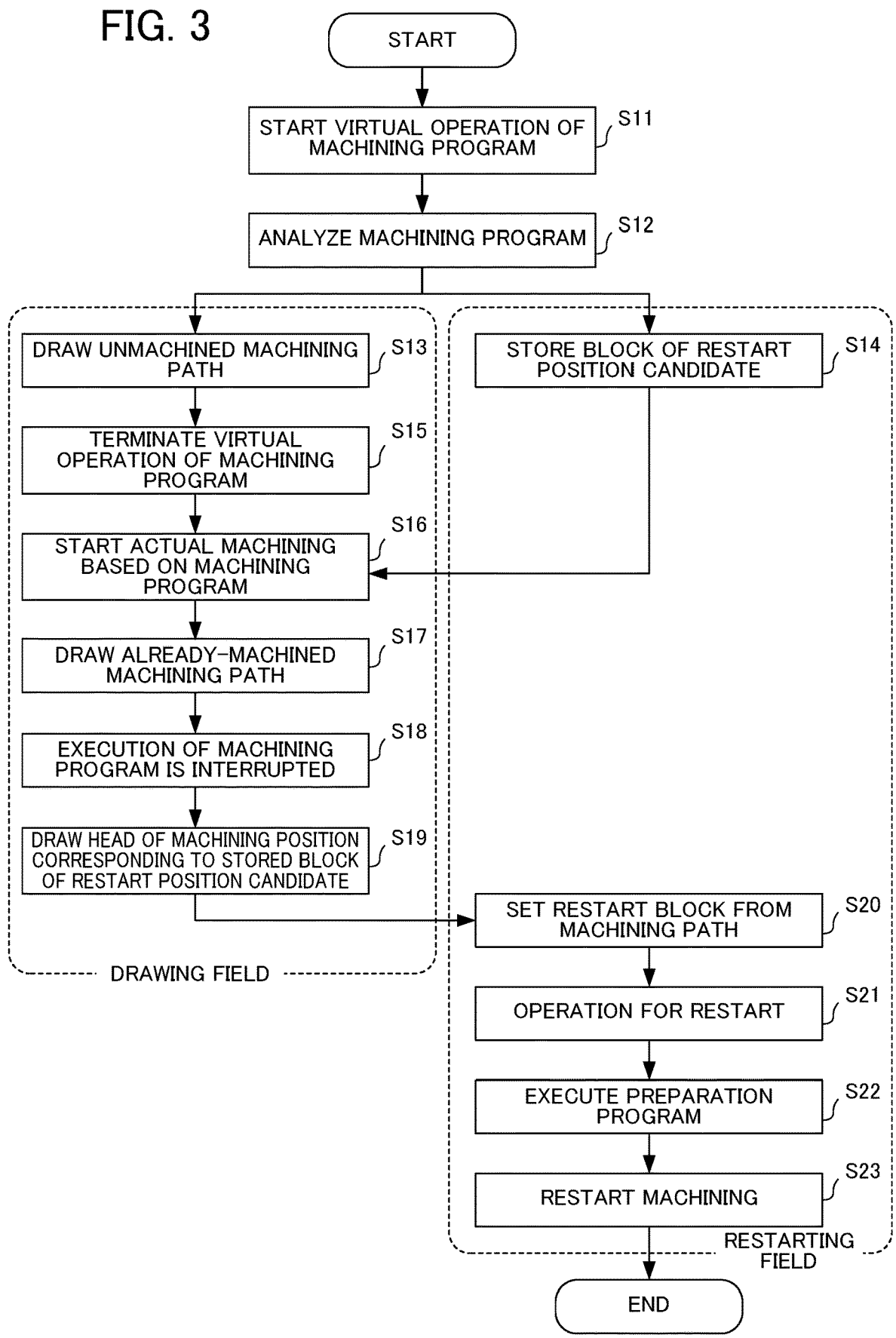
FIG. 3 is a flowchart indicating an operation of the numerical controller according to the embodiment of the present invention.

FIG. 3 is a flowchart indicating the operation of the numerical controller 100.

Figure 4:
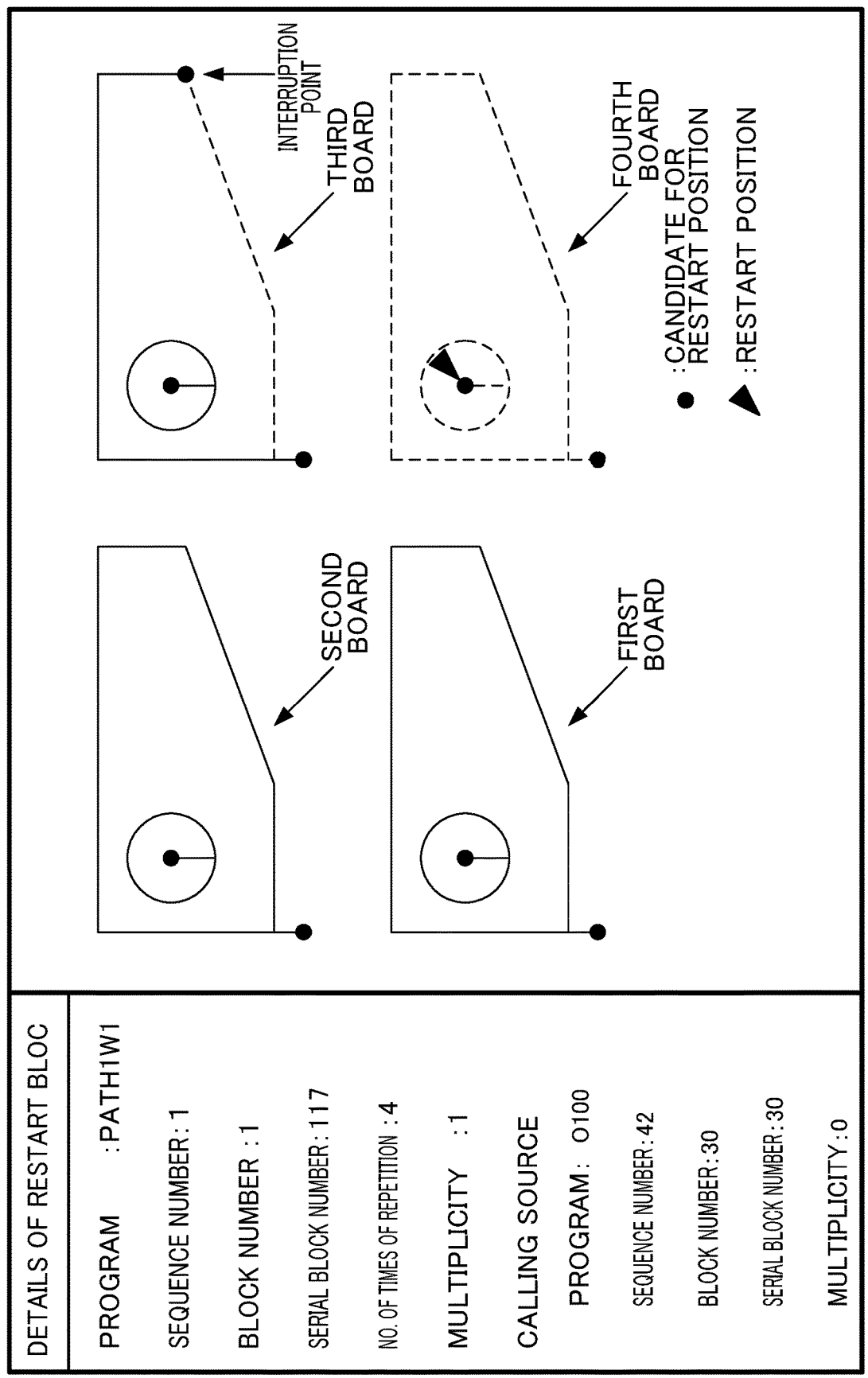
FIG. 4 is an example of a machining path graphic screen drawn by the numerical controller according to the embodiment of the present invention.

FIG. 4 shows an example of a machining path graphic screen to be displayed on a display unit 170 included in the numerical controller 100.

[1.1 Configuration of Numerical Controller]

The next description with reference to FIG. 1 and FIG. 2 is about the configuration of the numerical controller 100. Referring to FIG. 1, the numerical controller 100 comprises the control unit 111, a ROM 112, a RAM 113, a CMOS memory 114, a plurality of interfaces (an interface 115, an interface 118, an interface 119), a PLC (Programmable Logic Controller) 116, an I/O unit 117, a data communication bus 120, a plurality of axis control circuits (an axis control circuit 130 to an axis control circuit 134), a plurality of servo amplifiers (a servo amplifier 140 to a servo amplifier 144), a spindle control circuit 160, a spindle amplifier 161, a display/MDI unit 170, an operator's panel 171, an external device 172, and a laser control unit 180.

The control unit 111 controls the numerical controller 100 as a whole, and is realized by use of, for example, a processor.

The control unit 111 reads out the system programs and the application programs stored in the ROM 112 via the data communication bus 120, to control the numerical controller 100 as a whole on the basis of the system programs, and further to realize respective functions shown in the functional block diagram of FIG. 2 on the basis of the application programs. The control unit 111 will be detailed below.

The RAM 113 stores temporary calculation data and display data, and also various types of data input by an operator via the display unit 170.

The CMOS memory 114 is configured as a non-volatile memory, which is backed up by a battery not shown, and in which the storage state thereof is retained even when the power of the numerical controller 100 is turned off.

The CMOS memory 114 stores a machining program read in via the interface 115, a machining program input via the display unit 170, and the like.

In the ROM 112, various types of system programs for performing the editing mode processing required in creation and edition of the machining programs, and performing the processing for automatic operation are written in advance.

The various types of machining programs are enabled to be input via the interface 115 and the display unit 170, and to be stored in the CMOS memory 114.

The interface 115 allows the connection between the numerical controller 100 and the external device 172 such as a data server.

Such machining programs and various types of parameters are read in from the external device 172.

The machining programs edited in the numerical controller 100 may be stored in external storage means via the external device 172.

The PLC 116 outputs a signal to an auxiliary device of a machine tool via the I/O unit 117 on the basis of a sequence program built in the numerical controller 100, so as to perform control.

The PLC 116 further receives signals from various types of switches and the like on the operator's panel disposed in the main body of the machine tool, performs necessary signal processing, and thereafter transmits the signal to the CPU 111.

The display unit 170 is a manual data input device comprising a display, a keyboard and the like. The interface 118 receives a command or data from the keyboard of the display unit 170, and transmits it to the CPU 111.

The interface 119 is connected to the operator's panel 171 comprising a manual pulse generator and the like.

The axis control circuits 130 to 134 of respective axes receive the movement command amounts of the respective axes from the CPU 111, and output the commands of the respective axes to the respective servo amplifiers 140 to 144.

Upon the reception of the commands, the respective servo amplifiers 140 to 144 drive a servo motor 150 to a servo motor 154 of the respective axes.

The servo motors 150 to 154 of the respective axes, each of which is equipped with a position/speed detector, feed back position/speed feedback signals from the position/speed detectors to the axis control circuits 130 to 134, respectively, thereby performing feedback control of the position and speed.

In FIG. 1, the illustration of the position/speed feedback is omitted.

The spindle control circuit 160 receives a spindle rotation command with respect to the spindle whereto a tool is attached, and outputs a spindle speed signal to the spindle amplifier 161.

Upon the reception of this spindle speed signal, the spindle amplifier 161 rotates a spindle motor 162 at a commanded rotation speed to drive the machining head attached to the spindle.

The laser control unit 180 receives a laser output command for laser cutting based on a machining program, from the control unit 111.

Examples of the laser output command described above include commands such as of peak power, frequency and duty ratio for emitting a laser beam at predetermined output.

The laser control unit 180 outputs a control signal based on the laser output command to a laser cutting unit 190.

The laser cutting unit 190 is comprised with a laser oscillator which emits and outputs a laser beam, and a machining head and a nozzle for focusing the laser beam emitted by the laser oscillator by use of an optical system, to irradiate a workpiece with the laser beam.

The laser cutting unit 190 irradiates a workpiece with the laser beam at a predetermined output on the basis of the control signal received from the laser control unit 180.

It is noted that those skilled in the art know well a general method to move a workpiece and/or a tool by each axis connected to a motor, and a general laser cutting method by use of the laser cutting unit 190.

Therefore, detailed descriptions and illustrations of these issues are omitted.

The configuration example of the numerical controller 100 described above is merely one example.

For example, the above-described configuration example includes the five axis control circuits of the axis control circuits 130 to 134 and the five servo motors of the servo motors 150 to 154.

The present invention is not limited thereto. Any number of axis control circuits and any number of servo motors may be disposed.

It is noted that although the numerical controller 100 illustrated in FIG. 1 comprises the laser control unit 180, this is merely an example, and the present invention is not limited thereto.

More specifically, the numerical controller 100 may control a machine tool other than the laser machine.

FIG. 2 is the functional block diagram of the control unit 111.

The control unit 111 reads out the application programs stored in the ROM 112 via the data communication bus 120, to realize respective functions illustrated in the functional block diagram of FIG. 2, on the basis of the application programs.

A machining program analysis unit 121 analyzes a machining program prior to machining.

More specifically, the machining program analysis unit 121 may analyze the syntax of a machining program, for example, thereby generating the syntax tree of the machining program and extracting condition determination and/or operation on the basis of the generated syntax tree.

An unmachined path drawing unit 122 draws an unmachined machining path on the machining path graphic screen displayed on the display unit 170, on the basis of the result of the analysis of the machining program by the machining program analysis unit 121.

A restart position candidate setting unit 123 stores the information on a block serving as a restart position candidate at which machining is to be restarted, on the basis of the result of the analysis of the machining program by the machining program analysis unit 121.

More specifically, the restart position candidate setting unit 123 stores the information on a block including a specific command, as a block serving as a restart position candidate.

The examples of the above-described block including a specific command include a block including a subprogram call command, a block including a macro call command, a block including a macro modal call command, a block including a G code command enabling a predetermined function, a block including an M code command, a block including a B code command, and a positioning block.

It is noted that the above-described "subprogram call command" is a command for calling a slave machining program from a master machining program when a plurality of machining programs are in master-slave relations.

The above-described "macro call command" is a command for calling a macro program which is a group of commands registered in a memory.

The above-described "macro modal call command" is a command for calling a macro program, by designating only a variable while continuously using a once-called macro program.

The above-described "G code command" is a command by a G code for commanding a preparation function for machining.

More specifically, the examples of the "G code command" include commands by G codes for enabling functions such as synchronous control, composite control, superimposed control, cylindrical interpolation, polar coordinate interpolation, polar coordinate command, cutter diameter compensation, normal direction control, tool center point control, tool length offset, scaling, coordinate system rotation, 3-dimensional coordinate system conversion, programmable mirror, and workpiece setting error compensation.

The above-described "M code command" is a command by an M code for commanding an auxiliary function for machining by the laser cutting unit 190 to be described below.

The above-described "B code command" is a command by a B code for commanding a second auxiliary function for machining by the laser cutting unit 190.

The above-described "positioning block" is a block to be used when the machining head of the laser cutting unit 190 is moved to a cutting start position.

In the case where the machining program is a laser cutting program, the restart position candidate setting unit 123 may store, as blocks serving as restart position candidates, not only a block including a subprogram call command, a block including a macro call command, a block including a macro modal call command, a block including a G code command enabling a predetermined function, a block including an M code command, a block including a B code command, and a positioning block, but also a block including a piercing command, a block including a gap control command, and a block including an assist gas command.

It is noted that the above-described "piercing command" is a command for commanding drilling by laser.

The above-described "gap control command" is a command for commanding a preceding operation to adjust a dimension of a gap, that is, a gap amount, to a target value prior to the start of laser oscillation.

The above-described "assist gas command" is a command for spraying assist gas onto a machining point of a workpiece and the surroundings thereof during laser cutting.

It is noted that the restart position candidate setting unit 123 stores, as a block serving as a restart position candidate, an interruption block at which machining has been interrupted, in addition to the above-described blocks.

A during-machining drawing unit 124 draws the current positions under machining moment by moment during machining on the machining path graphic screen.

In particular, the during-machining drawing unit 124 draws the already-machined machining path, preferably by superimposing and displaying a line of the spots of the current positions under machining moment by moment during machining, on the unmachined machining path drawn by the unmachined path drawing unit 122.

The during-machining drawing unit 124 may draw the already-machined machining path with a solid line in the case where the unmachined machining path is drawn with a dotted line, while the during-machining drawing unit 124 may draw the already-machined machining path with a dotted line in the case where the unmachined machining path is drawn with a solid line.

When the machining is interrupted, a block head position drawing unit 125 draws the machining positions corresponding to the heads of the blocks serving as restart position candidates stored by the restart position candidate setting unit 123, on the machining path displayed on the machining path graphic screen.

The block head position drawing unit 125 may further display the entire path of the block for restart in a different color from that of other machining paths, on the machining path graphic screen.

A restart block setting unit 126 sets, as a restart block, the block corresponding to the machining position designated by a user from among the machining positions drawn by the block head position drawing unit 125.

That is, when a user designates any one of machining position from among the machining positions displayed on the machining path graphic screen as the position at which the machining is to be restarted, the restart block setting unit 126 sets the block corresponding to the machining position designated by the user, as a restart block.

A restart control unit 127 automatically executes a preparation program for setting the modal and/or auxiliary function required for restarting the machining, in response to the restart instruction from the user based on the restart block set by the restart block setting unit 126.

In particular, in the case where the machining program is a laser cutting program, and where the restart block set by the restart block setting unit 126 is a block including a piercing command, a block including a gap control command, or a block including an assist gas command, the restart control unit 127 automatically executes a preparation program related to the piercing command, the gap control command, or the assist gas command, in response to the restart operation.

The above-described "modal" is a G code which, when once commanded, lasts until a G code different from the current one is designated.

The above-described "auxiliary function" is a function for controlling an individual function of the machine tool controlled by the numerical controller 100.

The configuration of the numerical controller 100 has been described so far.

The operation of the numerical controller 100 is described below with reference to FIG. 3 and FIG. 4.

[1.2 Operation of Numerical Controller]

FIG. 3 is a flowchart indicating the operation of the numerical controller 100.

FIG. 4 shows an example of the machining path graphic screen drawn on the display unit 170 comprised in the numerical controller 100.

In step S11, the control unit 111 starts a virtual operation of the machining program, on the basis of an instruction from a user.

More specifically, the control unit 111 starts a virtual operation covering from the head to the end of the machining program without performing the actual machining.

In step S12, the machining program analysis unit 121 analyzes the machining program.

More specifically, the machining program analysis unit 121 analyzes the syntax of the machining program, for example, thereby generating the syntax tree of the machining program and extracting condition determination and/or operation corresponding to each type of machining from the generated syntax tree.

In step S13, the unmachined path drawing unit 122 draws an unmachined machining path on the machining path graphic screen displayed on the display unit 170, on the basis of the result of the analysis of the machining program.

In step S14, the restart position candidate setting unit 123 stores the information on a block serving as a restart position candidate at which the machining is to be restarted. The examples of the block serving as a restart position candidate include a block including a subprogram call command, a block including a macro call command, a block including a macro modal call command, a block including a G code command enabling a predetermined function, a block including an M code command, a block including a B code command, and a positioning block.

In the case where the machining program is a laser cutting program, the examples of the block serving as a restart position candidate include a block including a piercing command, a block including a gap control command, a block including an assist gas command, and a block including an E code of a machining condition setting function.

It is noted that step S13 and step S14 may be executed in parallel as shown in FIG. 3, or may be performed linearly.

In step S15, the control unit 111 terminates the virtual operation of the machining program.

In step S16, on the basis of the result of the analysis of the machining program, the control unit 111 controls the laser cutting unit 190 via the laser control unit 180, controls the servo amplifiers 140 to 144 respectively via the axis control circuits 130 to 134, and controls the spindle amplifier 161 via the spindle control circuit 160, thereby starting the actual machining based on the machining program.

In step S17, the during-machining drawing unit 124 draws the current positions under machining moment by moment during machining on the machining path graphic screen.

In particular, the during-machining drawing unit 124 draws the already-machined machining path, preferably by superimposing and displaying a line of the spots of the current positions under machining moment by moment, on the unmachined machining path drawn by the unmachined path drawing unit 122.

In step S18, the execution of the machining program is interrupted.

In step S19, the block head position drawing unit 125 draws the machining position corresponding to the head of the block serving as a restart position candidate stored by the restart position candidate setting unit 123, and the machining position corresponding to the head of the interruption block at which the machining has been interrupted, on the machining path displayed on the machining path graphic screen.

In step S20, a user designates the position at which the machining is to be restarted from among the machining positions corresponding to the restart position candidates drawn on the machining path.

Upon the reception of the designation, the restart block setting unit 126 sets the block corresponding to the machining position designated by the user as a restart block.

In step S21, the user operates to restart the machining program at the restart block set by the restart block setting unit 126.

More specifically, the user instructs the restart of the machining program via the display unit 170 or the operator's panel 171 comprised in the numerical controller 100.

In step S22, the restart control unit 127 automatically executes a preparation program for setting the modal and/or auxiliary function required for restarting the machining, in response to the restart instruction from the user based on the restart block set by the restart block setting unit 126.

In particular, in the case where the machining program is a laser cutting program, and where the restart block set by the restart block setting unit 126 is a block including a piercing command, a block including a gap control command, or a block including an assist gas command, the restart control unit 127 automatically executes a preparation program correspondingly related to the piercing command, the gap control command, or the assist gas command, in response to the restart instruction from the user.

In step S23, the control unit 111 restarts the actual machining based on the machining program at the restart block set by the restart block setting unit 126.

FIG. 4 shows an example of the machining path graphic screen at the time of step S20 in the flowchart shown in FIG. 3.

It is noted that although FIG. 4 shows an example of the machining path graphic screen of the case where the laser machine controlled by the numerical controller 100 executes multi-piece cutting, the present invention is not limited thereto.

The machining paths are illustrated on the right side of the machining path graphic screen.

In the example shown in FIG. 4, already-machined machining paths are indicated with solid lines, while the unmachined machining paths are indicated with dotted lines.

The present invention is not limited thereto. Alternatively, the already-machined machining paths may be indicated with dotted lines, while the unmachined machining paths may be indicated with solid lines.

FIG. 4 shows the example in which the machining has been interrupted in the course of hollowing the third board by laser cutting in the original schedule of hollowing four boards.

Each of black circles on the machining paths indicates a machining position candidate at which the machining is to be restarted.

More specifically, in the example shown in FIG. 4, each board of the first board to the fourth board has two positions of the heads of the blocks each including a piercing command for starting cutting by laser.

The third board further includes the black circle indicating the head of the interruption block at which the machining has been interrupted, as an interruption point.

The user selects the machining position at which the machining is to be restarted from among the plurality of machining positions indicated with black circles.

FIG. 4 shows the example in which the machining position set in the hollow portion on the fourth board is selected.

The restart block corresponding to the selected machining position is detailed on the left side of the machining path graphic screen.

The item of "PROGRAM" indicates the name of the program under execution.

The item of "SEQUENCE NUMBER" indicates the number of the position of the machining program.

The item of "BLOCK NUMBER" indicates the number for identifying the position of the restart block in the machining program at the present moment.

The item of "SERIAL BLOCK NUMBER" indicates the number for identifying the position of the restart block in all the blocks in the entire machining program.

For example, in the case where the machining is to be restarted from the middle of the fourth hollowing in the multi-piece cutting shown in FIG. 4, since the hollowing by laser has been repeated three times already, the block numbers related to the first hollowing to the third hollowing are added to the block number under the fourth hollowing, and the resultant number is indicated in "Serial block number." The item of "NO. OF TIMES OF REPETITION" indicates the number of times of repetition of the restart block in the machining program.

The item of "MULTIPLICITY" indicates a numerical value indicating the generation number of the program whose name is indicated in "PROGRAM," seen from the main machining program in the master-slave relations of the entire machining programs. The indication of "MULTIPLICITY 1" means that the program is the first generation seen from the main machining program, that is, the program is to be called directly from the main machining program not via any other machining program.

The item of "CALLING SOURCE" indicates the program calling the program whose name is indicated in "PROGRAM."

The operation of the numerical controller 100 has been described so far.

The next description with reference to FIG. 5 is about the procedure of user's operation at the time when a user restarts machining by using the numerical controller 100.

[1.3 User's Operation]

FIG. 5 is a flowchart indicating an example of the procedure of user's operation.

When machining by a machine tool is interrupted, the machining path graphic screen shown in FIG. 4, for example, is displayed on the display unit 170.

In step S31, a user selects the machining position at which the machining is to be restarted, from among the machining positions corresponding to the restart position candidates drawn on the machining path displayed on the machining path graphic screen.

In step S32, the user presses a soft key [Restart setting]. In response to the pressing, the restart block corresponding to the machining position selected by the user is set.

In step S33, the user presses a soft key [Restart]. In response to the pressing, the numerical controller 100 restarts the machining by the machine tool.

Although, in the above-described example, the numerical controller 100 according to the first embodiment controls a laser machine as a machine tool, the present invention is not limited thereto.

That is, the present invention is applicable to a numerical controller for controlling a machine tool other than a laser machine, for example, a lathe, a drilling machine, a boring machine, a milling machine, a grinding machine, a gear cutting and gear finishing machine, a machining center, an electrical discharge machine, a punch press machine, a conveying machine, or a plastic injection molding machine.

[1.4 Effects Produced by First Embodiment]

When the machining is interrupted in the machine tool controlled by the numerical controller 100 according to the present embodiment, the numerical controller 100 draws the machining positions corresponding to the heads of the blocks serving as machining restart position candidates on the machining path displayed on the machining path graphic screen, and sets as a restart block the block including the machining position designated by the user on the machining path graphic screen.

This allows an operator to visually grasp the position of the block serving as a restart position at which the machining is to be restarted on the actual machining path, and enables to restart the machining with fewer steps in the procedure.

The numerical controller 100 stores, as a block serving as a restart position candidate, at least one type of block out of an interruption block, a block including a subprogram call command, a block including a macro call command, a block including a macro modal call command, a block including a G code command enabling a predetermined function, a block including an M code command, a block including a B code command, and a positioning block.

This allows the machining program to be analyzed prior to the actual machining, to store in advance the information on the blocks serving as restart position candidates.

The numerical controller 100 further superimposes and draws the current positions under machining moment by moment on the unmachined machining path.

This allows the user to visually grasp the extent of the machining having been done in the entire machining path originally set.

The numerical controller 100 further automatically executes the preparation program for setting the modal and/or auxiliary function required for restarting the machining, in response to the restart operation by the user.

This enables to simplify the procedure prior to restarting the machining.

In the case where the machining program is a laser cutting program, the numerical controller 100 stores, as a block serving as a restart position candidate, not only an interruption block, a block including a subprogram call command, a block including a macro call command, a block including a macro modal call command, a block including a G code command enabling a predetermined function, a block including an M code command, a block including a B code command, and a positioning block, but also a block including a piercing command, a block including a gap control command, and a block including an assist gas command.

In the case where the machining program is a laser cutting program, and where the set restart block is a block including a piercing command, a block including a gap control command, or a block including an assist gas command, the numerical controller 100 automatically executes the preparation program correspondingly related to the piercing command, the gap control command, or the assist gas command, in response to the restart operation.

Accordingly, the control method according to the present invention can be specialized and applied to the case where a laser machine is subjected to the control by the numerical controller 100.

Although the embodiment of the present invention has been described so far, the present invention is not limited to the above-described embodiment.

The effects described in the present embodiment are merely listed as the most preferable effects produced by the present invention. The effects produced by the present invention are not limited to those described in the present embodiment.

EXPLANATION OF REFERENCE NUMERALS

100 NUMERICAL CONTROLLER
111 CPU
123 RESTART POSITION CANDIDATE SETTING UNIT
124 DURING-MACHINING DRAWING UNIT
125 BLOCK HEAD POSITION DRAWING UNIT
126 RESTART BLOCK SETTING UNIT
127 RESTART CONTROL UNIT

What is claimed is:

1. A numerical controller comprising:
    a display configured to display a machining path graphic screen; and
    a processor configured to:
        analyze a machining program prior to machining to generate a syntax tree of the machine program;
        draw an unmachined machining path on the machining path graphic screen, on a basis of a result of an analysis of the machining program prior to the machining;
        store, prior to the machining, information on a block serving as a restart position candidate where the machining is to be restarted after the machining is interrupted, the restart block candidate being extracted from the syntax tree generated by the analysis of the machining program prior to machining;
        display current positions under machining moment by moment during the machining;
        draw, when the machining is interrupted, a machining position corresponding to a head of the block serving as a stored restart position candidate, on the machining path displayed on the machining path graphic screen;
        receive, from a user, designation of a machining positon at which the machining is to be restarted, from among machining positions corresponding to restart position candidates drawn on the machining path displayed on the machining path graphic screen;
        set a block corresponding to the machining position designated by the user as a restart block; and
        receive, from the user, an instruction to restart the machining, and restart the machining at the machining position designated by the user in response to receiving the instruction to restart the machining.

2. The numerical controller according to claim 1, wherein the processor stores, as the restart position candidate, at least one type of block out of an interruption block, a block including a subprogram call command, a block including a macro call command, a block including a macro modal call command, a block including a G code command enabling a predetermined function, a block including an M code command, a block including a B code command, and a positioning block.

3. The numerical controller according to claim 1, wherein the processor superimposes and draws the current positions under machining along the machining path moment by moment on the drawn unmachined machining path.

4. The numerical controller according to claim 1, wherein when the machining program is a laser cutting program, the processor stores, as the restart position candidate, at least one type of block out of an interruption block, a block including a subprogram call command, a block including a macro call command, a block including a macro modal call command, a block including a G code command enabling a predetermined function, a block including an M code command, a block including a B code command, a positioning block, a block including a piercing command, a block including a gap control command, and a block including an assist gas command.

5. The numerical controller according to claim 1, wherein the processor is further configured to automatically execute a preparation program for setting at least one of a modal and an auxiliary function required for restarting the machining, in response to restart instruction from a user based on the set restart block.

6. The numerical controller according to claim 5, wherein when the machining program is a laser cutting program, and when the set restart block is a block including a piercing command, a block including a gap control command, or a block including an assist gas command, the processor automatically executes a preparation program related to the piercing command, the gap control command, or the assist gas command, in response to the restart instruction from the user.

* * * * *